United States Patent [19]
Larsson

[11] Patent Number: 5,351,744
[45] Date of Patent: Oct. 4, 1994

[54] DEVICE IN A PRESS CASTING MACHINE AND METHOD OF USING SUCH DEVICE

[75] Inventor: Bengt-Inge Larsson, Herrljunga, Sweden

[73] Assignee: Tour & Andersson AB, Sweden

[21] Appl. No.: 955,702

[22] PCT Filed: Jun. 18, 1991

[86] PCT No.: PCT/SE91/00436
§ 371 Date: Dec. 16, 1992
§ 102(e) Date: Dec. 16, 1992

[87] PCT Pub. No.: WO91/19580
PCT Pub. Date: Dec. 26, 1991

[30] Foreign Application Priority Data
Jun. 19, 1990 [SE] Sweden .............. 9002173-4

[51] Int. Cl.5 .............. B22D 17/22; B22D 17/24
[52] U.S. Cl. .................. 164/342; 164/343; 164/137
[58] Field of Search .......... 425/186, 190, 192 R; 164/137, 339, 342, 343, 412

[56] References Cited

U.S. PATENT DOCUMENTS

| | | | |
|---|---|---|---|
| 4,449,907 | 5/1984 | Yonezawa et al. | |
| 4,529,371 | 7/1985 | Nickley | |
| 4,673,022 | 6/1987 | Mitzner | 164/137 |
| 4,758,147 | 7/1988 | Inaba | |
| 4,923,381 | 5/1990 | Delmer et al. | 425/186 |

FOREIGN PATENT DOCUMENTS

| | | |
|---|---|---|
| 0315801 | 5/1989 | European Pat. Off. |
| 0353597 | 2/1990 | European Pat. Off. |
| 3220911 | 10/1983 | Fed. Rep. of Germany |
| 3737598 | 1/1988 | Fed. Rep. of Germany |

OTHER PUBLICATIONS

59-65560 Apr. 19, 1983 Japanese Abstract.

Primary Examiner—P. Austin Bradley
Assistant Examiner—Erik R. Puknys
Attorney, Agent, or Firm—Davis, Bujold & Streck

[57] ABSTRACT

A press casting machine (2) is provided with a stand (4) and a lower stationary machine table (5), from which bearers (6) project upwards, supporting an upper vertically displaceable machine table (7). A tool half (9 and 10 respectively) is connected to each machine table. These halves form, jointly with inserts, cores, etc., mounted in the halves, a parent tool (8). In order to be able to exchange inserts, to service the machine etc. the tool halves can be disconnected from and reconnected to the respective machine table through an external control, and the entire parent tool can be lifted by means of the upper machine table and be positioned on a tool carriage (60), which can be run out of the press casting machine and onto a main carriage (61), which runs on floor rails (64) and which can support a second parent tool for a quick exchange.

13 Claims, 7 Drawing Sheets

DEVICE IN A PRESS CASTING MACHINE AND METHOD OF USING SUCH DEVICE

BACKGROUND OF THE INVENTION

In conventional press casting machines the tool halves, which when they are joined together form a mold, are fastened in such a way, that it is very hard and time-consuming to exchange tool halves, which also are called mold tools. On production-technical grounds press casting machines are to be used during long periods of time, which means, that a multishift-use will be the most common one. Consequently, presently used tool exchanges seldom coincide with possible downtime periods, and an exchange must then be done in the middle of a production period.

A conventional exchange, which requires an interference with the interior parts of the machine, implies first of all a certain cooling period in order to at all allow the personnel to work with the machine without substantial burn injury risks. Said cooling period may be as long as 20-60 minutes, which is a long period of time, during which a large energy consumption takes place in order to keep the metal, which is to be molded, liquid and during which the production is standing still.

Also, without direct burn injury risks machine manipulations are difficult and risky, since the available space is very small and thus, injuries easily happen and the operation position often is very inadequate from an ergonomical point of view. An exchange, which is done completely in a manual way, requires usually 2–3 hours. Since the operation is done completely in a manual way, human errors may also easily occur. By way of example bolts and nuts, which are not sufficiently tightened, may result in that a machine part comes loose and castings will be rejected and tools be destroyed.

Also, mere service work is subjected, as to conventional press casting machines, to the above-mentioned drawbacks. This may result in that regular service work is neglected and the machine and machine parts are subjected to an increased wear as well as in that the products will have an inferior quality. In case a strongly different product category is to be produced instead, the parent tools must also be exchanged, which means production reductions during a period of 6–12 hours, apart from a very demanding and expensive effort in a very exacting working environment.

Known technique is revealed by U.S. Pat. No. 4,449,907, U.S. Pat. No. 4,529,371, U.S. Pat. No. 4,758,147, DE-A-3 220 911, DE-A-3 737 598, EP-A-0 353 597 and JP 58-65 560.

U.S. Pat. No. 4,449,907 relates to a device for exchange of tools at an injection machine for plastic material incorporating horizontally active tools and a vertical parting plane. In this case, don't arise same or similar problems as mentioned hereinbefore in connection with vertically active press casting machines for metal do not arise. Neither is there any comparable design of machines.

U.S. Pat. No. 4,529,371 concerns, like the afore-mentioned publication, a device for exchange of tools at an injection machine for plastic material.

U.S. Pat. No. 4,758,147 is a further example of a device for exchange of tools at an injection machine for plastic material.

DE-A-3 220 911 is still a further example of a device for exchange of tools at an injection machine for plastic material.

DE-A-3 737 598 refers also to a horizontally active injection machine and a device for exchange and positioning of tools in connection with such machine. Even here, there are no comparable problems and solutions to such.

EP-A-0 353 597 concerns a horizontally active injection machine with vertical parting plane. Although there are vertically adjustable supporting plates for the tools as well as an elevator and a turning device, all this equipment is arranged outside the machine and without any comparability with the problems of a vertically active press casting machine.

JP 58-65 560 is the only one of these publications to concern a vertically active press casting machine, where tools may pass through the machine, but without lifting of the parent tool or any tool half. These machine parts can consequently not pass any obstacles as other machine parts, e.g. core pulling devices which extraordinarily limits design and usability of the machine. This conventional machine lacks upper injection plunger and provides supply of metal from below. Discharge takes place in the upper mould half and the tool exchange device occupies two sides of the machine. Any tool handling in connection with this machine is neither shown nor described.

SUMMARY OF THE INVENTION

The object of the present invention is to counteract and as far as possible eliminate the drawbacks mentioned above as well as suggest such features, which will render possible fast exchanges of mold tools, whether tool inserts or parent tools having such inserts are used or not. These exchanges are to be done with as few manual efforts as possible or in fact completely or partially automaticly and without consideration of any cooling period. The object of the invention is also to quite generally advance the state of the art in this field and create opportunities for a substantial improvement of the occupational security and the working environment.

Tests with a device and a method according to the invention have shown that exchange of tool inserts is possible in a short period of time of about 2–5 minutes and that an exchange to a strongly differing product category does not require more time than 12–20 minutes. In addition to these enormous gains in the time, cost, security and environment fields, the invention offers possibilities of improved and easier service of the tools and those parts which interact with the tools, entirely without that stress, which an idle press casting machine leads to. On the contrary the productivity increases and quite generally occurring machine errors can usually be taken care of quicker and more reliably thanks to the invention, which also allows the use of preheated tools, the downtime of the machine thereby being decreased still more, in a pratical example with about 30 minutes.

BRIEF DESCRIPTION OF THE DRAWINGS

Additional characterizing features and advantages of the present invention are set forth in the following description, reference being made to the accompanying drawings, which show a few preferred but not limiting embodiments of the invention. The drawings show in detail.

DETAILED DESCRIPTION OF THE INVENTION

Figure 1:
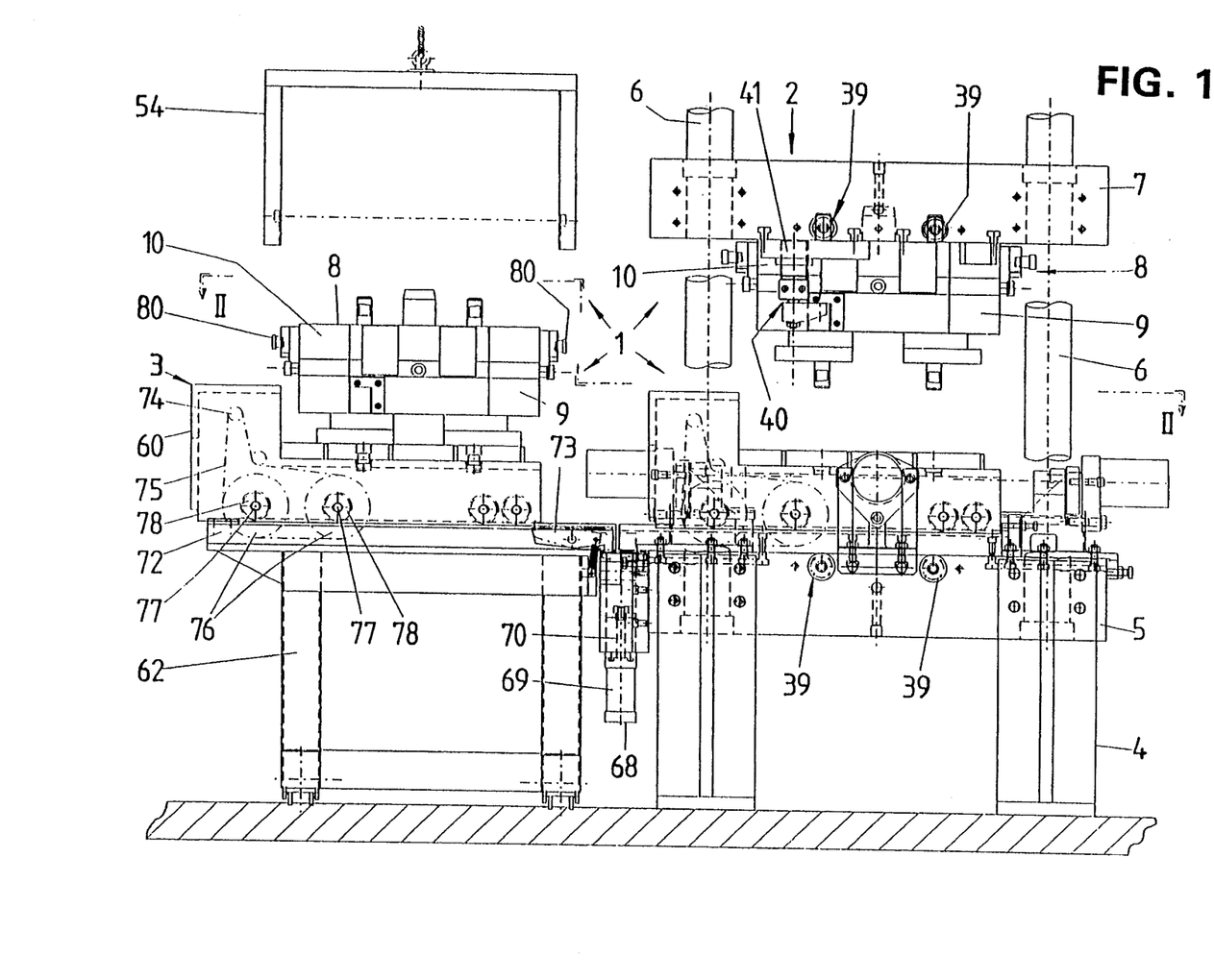
FIG. 1 a schematic lateral view of a device according to the invention with its parent tool and two different parent tools respectively, shown in two different functional positions, in a position for exchange.

In FIG. 1 the device according to the invention in its entirety 1 comprises a press casting machine 2, a removal device 3 and a handling device 54 for a parent tool 8 and its isolated halves 9,10 respectively. The press casting machine includes a stand 4, on which a lower stationary machine table 5 is mounted, from which in its turn vertical support bearings 6 project upwards, which are placed in the corner areas and support an upper machine table 7, which is vertically movable.

On lower machine table 5 the parent tool 8 is fastened in its press casting position, and it mainly comprises a lower half 9 and an upper half 10. Each one of these halves holds its half 11 and 12 respectively of inserts 13. Lower parent tool half 9 is supported by four supporting and spacing elements 14 and mesh with vertical bores 15 in the stationary machine table 5 by means of vertically projecting guide and locking pins 16, which preferably in the middle of and on two diametrically opposite sides are provided with milled locking cuts 17, the lower limiting surface 18 of which suitably slants downwards and outwards to provide a clamping with a wedge action, which is caused by end 19, which is bifurcated in this case, by means of a locking bar 20.

These locking bars are displaceably mounted in the lower and the upper machine table in horizontal control bores 21, the inner end areas of which cross the bores 15. Bifurcated end 19 can then be designed as a separate part, which is introduced in the machine table from above through e.g. an opening 22, which is closed by means of a locking block 23, which is fastened to the machine table by means of bolted joints 24. Locking bar 20 or an extension of the proper bar meshes with a flanged end 25 with a coupling cut 26 in a rotary-symmetrical coupling end 55 of bifurcated end 19, with opening 27 of which a guide element 28 meshes from above, which is fastened in locking block 23 by means of a screw 29, and which prevents a rotation of the bifurcated end on control bar 21 and in relation to the respective locking pin 16.

Figure 5:
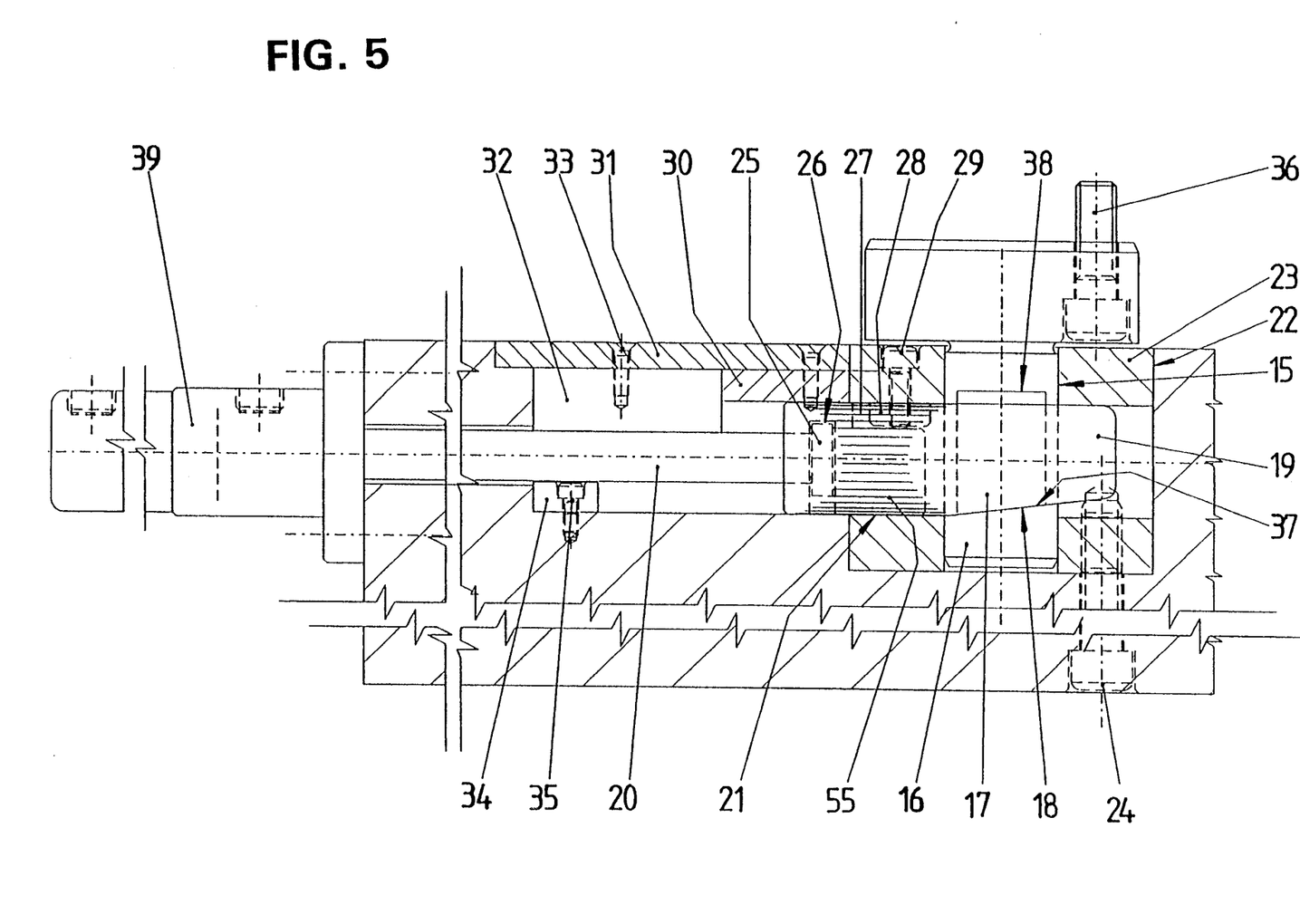
FIG. 5 the tool locking in the machine in a vertical section along line V—V in FIG. 2.

Furthermore, in FIG. 5 a guiding profile 30 for the movements of the bifurcated end is shown and a covering plate 31, which uncover a hollow space 32 and which is fastened by means of screws 33. Finally a stop block 34 is provided in the lower left end of hollow space 32 and fastened by means of screws 35.

Supporting and spacing elements 14, from which pins 16 project downwards, are fastened in lower parent tool half 9 by means of threaded bolts 36, which can be introduced from below or from above in said half.

As also is, shown in FIG. 5, the bifurcated end is at its bottom, provided with corresponding slanting surfaces 37 as surfaces 18, whereas upper limiting surfaces 38 of cuts 17 also in their locking position are placed at a distance above the bifurcated end, whereby an adequate locking force always is secured, even when a certain wear has occurred.

Each one of locking bars 20 is attached to its hydraulic cylinder 39 and is simultaneously actuated to be locked and released respectively via e.g. a machine central unit (not shown). Each machine table is provided with e.g. two locking bar pairs, mounted on two opposite sides of the respective table. The lower as well as the upper parent tool half are fastened in the respective machine table in a preferably corresponding way. However, normally no support and spacing elements are required at the top, and thus the upper parent tool half can directly contact the upper machine table.

FIGS. 3 and 4a–c show, how parent tool 8 can be fastened to the respective machine table and be released therefrom also by means of preferably two coupling elements 40, mounted diagonally opposite one another on the upper machine table. Each of the elements comprises a hydraulic torsional cylinder 41, which projects downwards from the upper machine table and downwards is provided with a torsional plunger 42 with a horizontally projecting gripping element 43, which is designed to mesh with a e.g. downwards, forwards and on one side open gripping cut 44 on diagonally opposite places in the respective sides of lower parent tool half 9.

Figure 3:
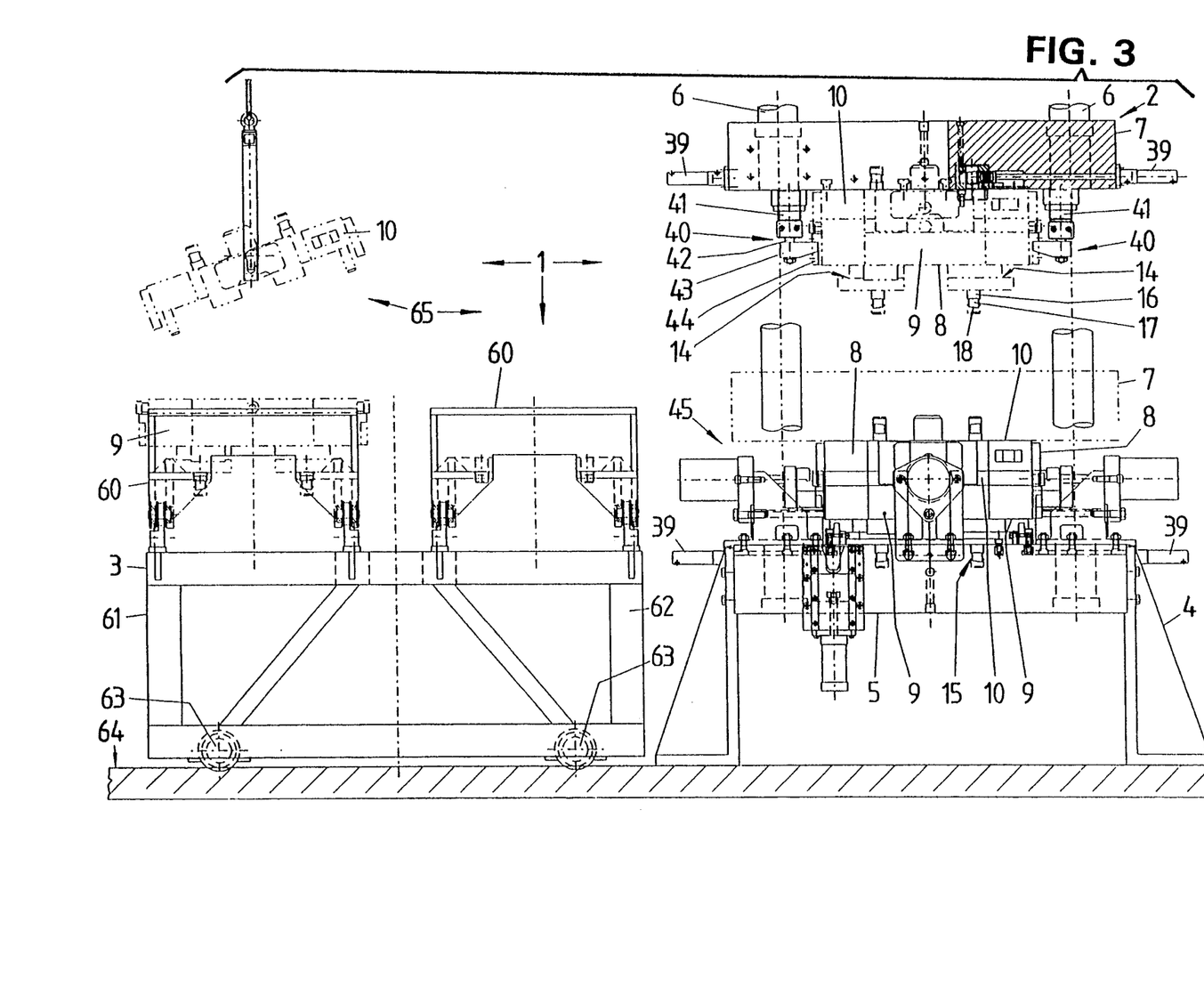
FIG. 3 a view from the left in FIG. 1, but the removal device has been moved to the left, where a parent tool is shown in different functional positions.
Figure 4A:
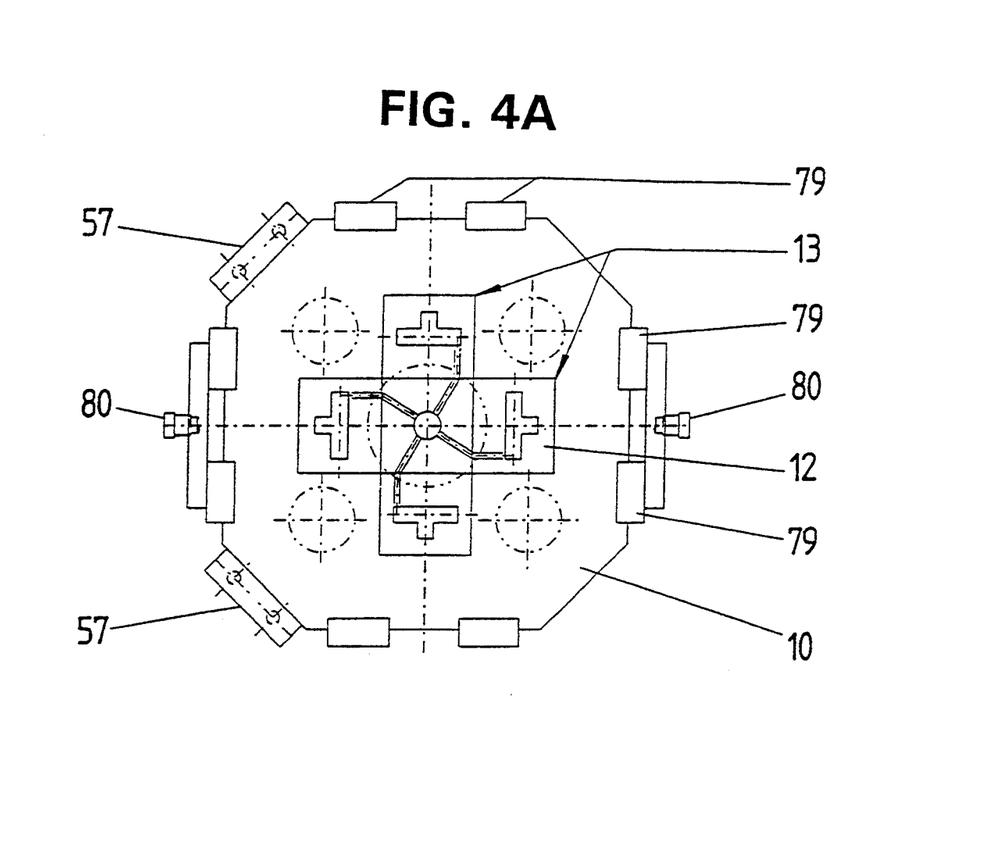
FIGS. 4a–c the parent tool according to FIG. 3 in a lateral view FIG. 4b, as well as top views of the two open halves, FIGS. 4a and 4c.
Figure 4B:
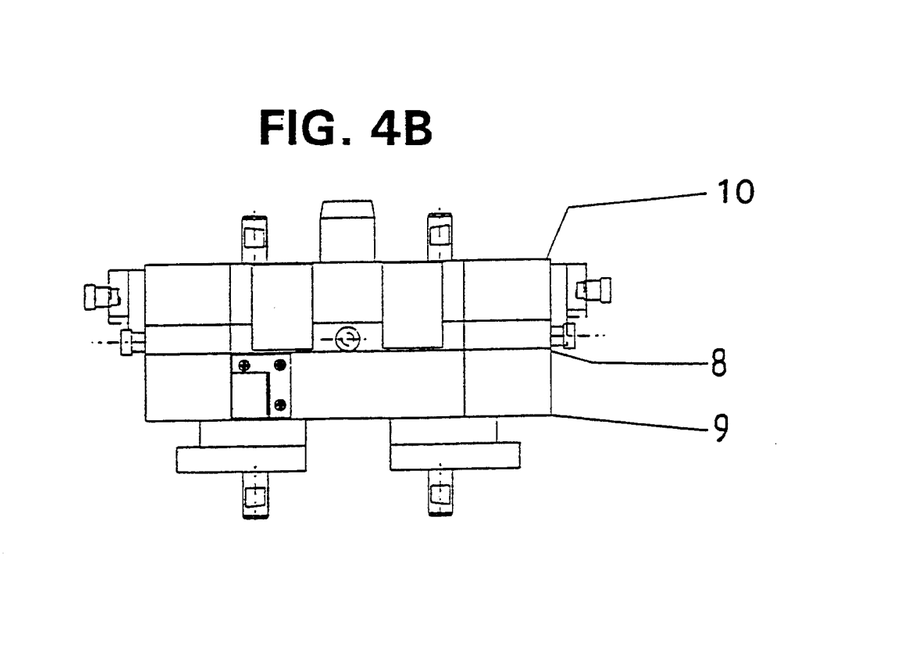
Figure 4C:
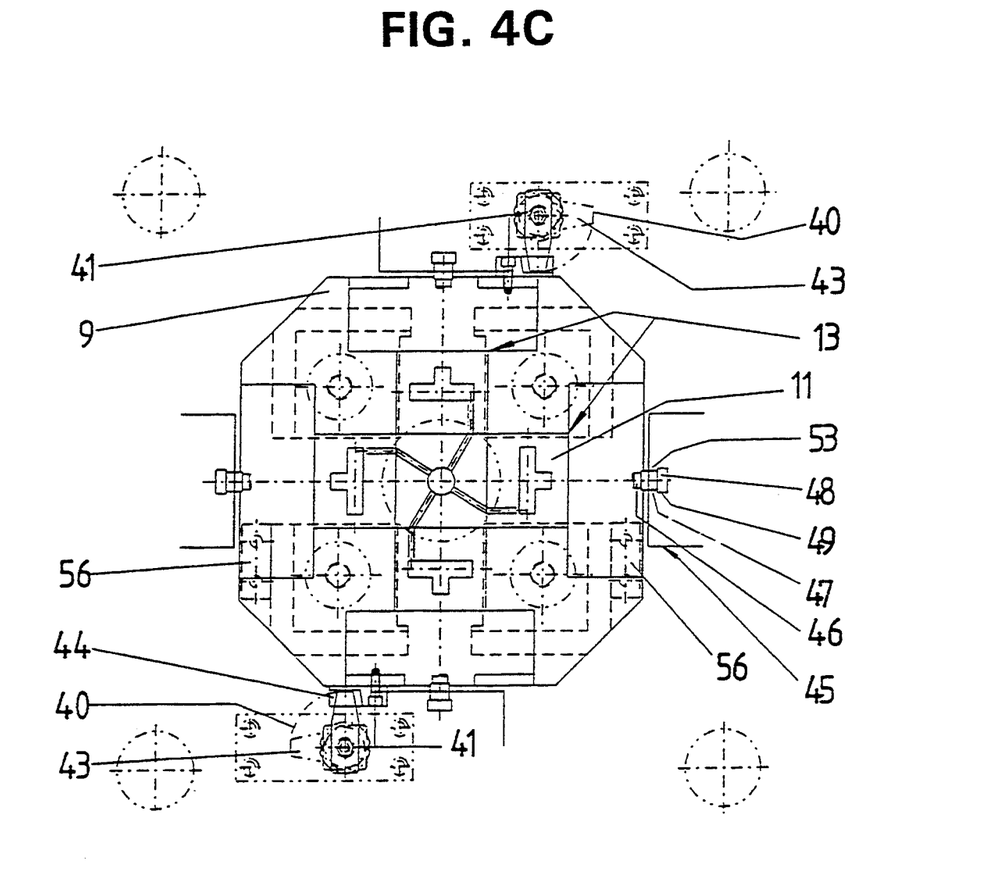

FIG. 4a–c shows that the torsional cylinders are designed to turn plungers and gripping elements a quarter of a revolution in order to attain a coupling between the upper machine table and the lower parent tool half with the upper tool half mounted therebetween. In this position, as is shown in FIG. 3, the locking bars of the lower parent tool half are suitably released automaticly and in sequence with the gripping movement of the torsional cylinders, and in this way the upper machine table can be lifted with the entire parent tool suspended from it. The upper parent tool half then suitably, i.e. for security reasons, can be locked to the upper machine table by means of associated locking bars, which otherwise also can be released automaticly, when the torsional cylinders are actuated into a gripping position, provided this is deemed adequate for security reasons. When a casting is done, the torsional plungers are released from the lower parent tool half, and in this way the two tool halves can freely be opened up and closed. The two tool halves remain locked to the respective tables by means of their locking bars.

The drawings also show, see FIG. 4, that the lower parent tool half is provided with so called core pulling devices 45, operating rod 46 of which projects horizontally from the respective side of the half and is terminated in the form of a coupling head 47, which e.g. is provided with a flange 48 on all sides. The coupling head is designed to mesh from above with each one of coupling cuts 49 associated with end 50 of a core pulling cylinder 51, which is fastened to the lower machine table and is activated during the casting.

When the entire parent tool is to be lifted, the operating rods are placed in their in the associated tool half inserted position and the coupling heads can be lifted upwards from their cuts 49 without having to change the position of the core pulling cylinders. When later on the lower tool half is to be returned to its casting position, the coupling heads are automaticly inserted in the cuts 49, which have a V- or U-shaped opening 52, those edge areas of the said opening, which face cylinder 51, being shielded by a locking flange 53.

Particularly in FIG. 4 connections 56 and 57 for coolant passages are also shown, which passages connect the respective tool half with the respective machine table, male and female parts, not shown in detail and provided with seals, mesh automaticly with each other, when the tool halves are coupled with the machine tables, in such a way that a coolant automaticly can circulate through the tool halves and cool the same during the casting.

Figure 2:
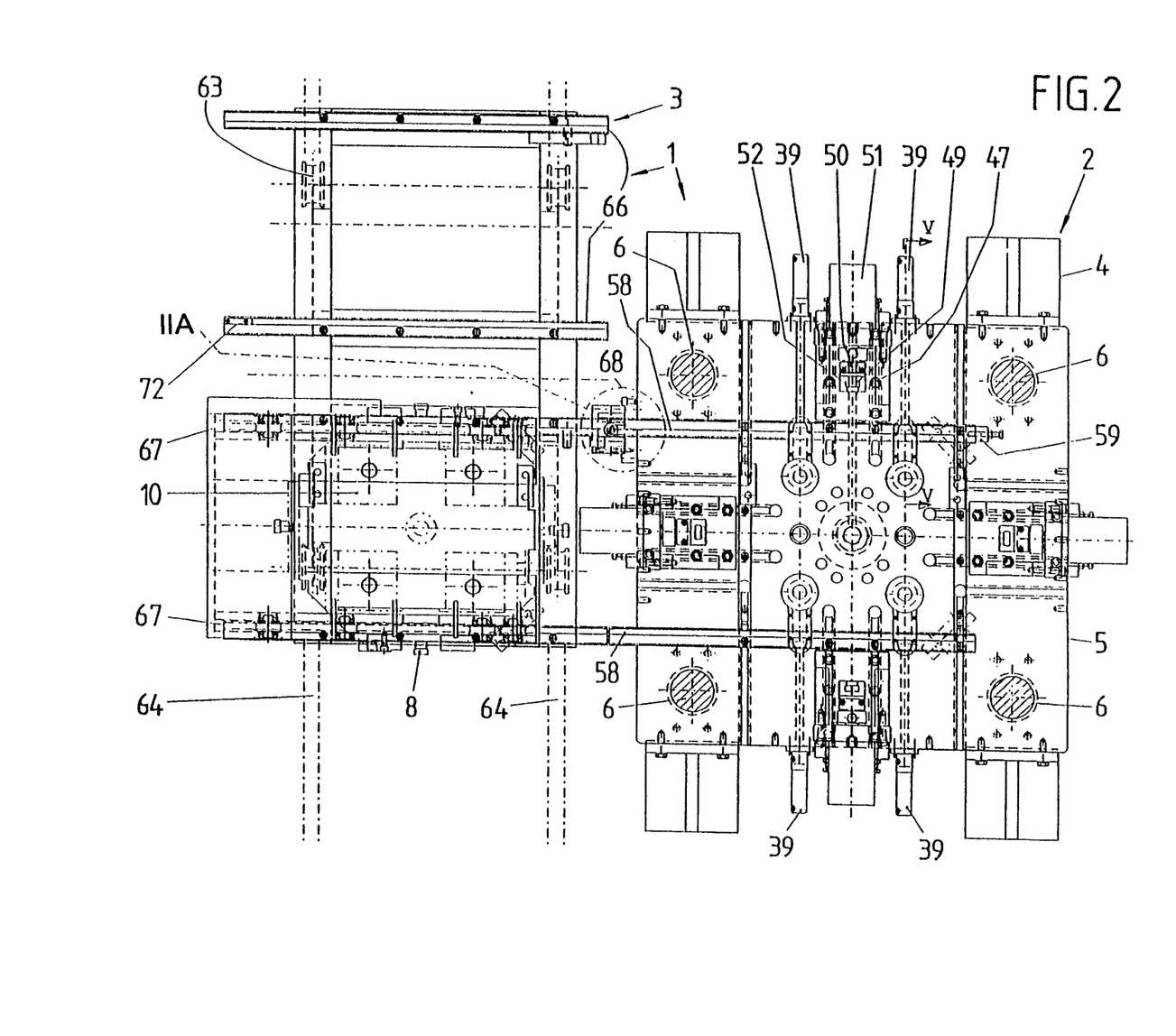
FIG. 2 a top view of the device according to FIG. 1, along the plane II—II in FIG. 1.
Figure 2A:
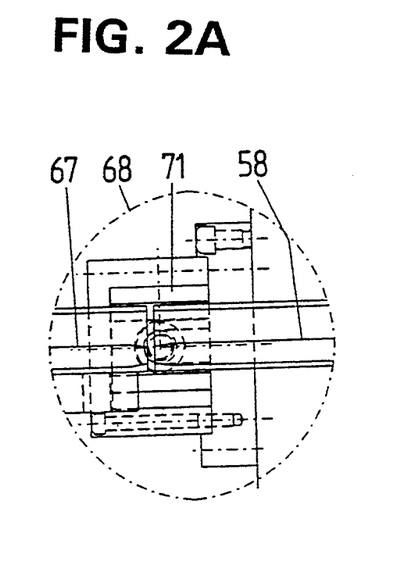
FIG. 2A a close up of the portion of FIG. 2 inside circle IIa.

On the lower machine table a rail pair 58 is mounted, which at one side of the machine is provided with an adjustable stop element 59, designed to limit the insertion movement of a tool carriage 60, which constitutes a part of the removal device 3, the other part of which is a main carriage 61, on which one or preferably two tool carriages can be stored and run perpendicularly to the removal directions of the main carriage (see FIG. 2). The main carriage has a stand 62, supported by wheels 63, which in their turn run on floor rails 64, which lead from the machine to e.g. a service place 65. On the main carriage preferably two rail pairs 66 and 67 are mounted, the direction of which is perpendicular to the displacement directions of the main carriage.

The rail pairs are designed to be connected to the machine-connected rail pair 58, a position fixing device 68 being actuated. The latter device can comprise a pneumatic cylinder 69, piston 70 of which pushes a locking fork 71 upwards, which from below holds one of the two connection areas, by means of which the position of the main carriage can be locked.

The tool carriages are also designed to be positionally fixed on the main carriage by means of preferably one permanent stop 72 on the main carriage on the side, which is turned away from the machine, and a temporary stop 73 on the side, which is turned towards the machine. Stop 72 can be a raised part, which is screwed on, whereas stop 73 suitably is a spring-loaded rocker arm, one end of which during the locking function projects upwards above the rail level in order to prevent the tool carriage from rolling off the main carriage and in a neutral position is pivoted vertically to a level below the rail level against the action of the spring force, the tool carriage being able to roll off from the main carriage and into the machine on its rail pair 58.

The neutral position is obtained preferably automaticly by letting the piston 70 or locking fork 71 actuate the other end of the rocker arm in a way which is shown with dashed lines in FIG. 1. The main carriage can be halted in the respective coupling position in a suitable way, already known per se, e.g. by means of micro switches or two manual stops, among which the presently used ones can be chosen. The main carriage can be displaced manually or by means of a suitable driving device, already known per se, preferably a pneumatic engine, the driving device suitably having a larger gear change in order to obtain a low speed and a high coupling precision.

Each tool carriage 60 is suitably provided with a driving device 74, e.g. a pneumatic engine having a chain gearing 75 with large driving wheels 76, which via shafts 77 drive small carriage wheels 78 in order to obtain, also in this case, a low speed and a high coupling precision. All carriages 60,61 are, when they are engine-driven and when the control is completely or partially automatic through ducts respectively, connected to a control center, not shown.

A tool change by means of a device according to the present invention is done in the following way: In FIG. 3 the working position of the press casting machine is shown with dot/dash-lines as to the upper machine table. If now a change to other inserts is to be done and possibly even to other parent tools, then the upper machine table is removed to the raised position, shown in FIG. 3 with continuous lines, with the entire parent tool being suspended from the upper machine table, which is shown with dot/dash-lines.

However, before the upper machine table is lifted, a number of preliminary operations have to be done. First of all the coolant feeding is disconnected and the coolant in the coolant passages in the two tool halves are emptied. The emptying is done through suction. The core pulling devices 45 are completely inserted. Preferably the synchronization cylinders 39 of the lower machine table are now activated to pull locking bars 20 and release bifurcated ends 19 from pins 16 simultaneously with an activation of the torsional cylinders in order to pivot gripping elements 43 into cuts 44. The synchronization is done in the simplest way by having cylinders 39 and 41 connected in the same pressure medium circuit. In this way only one trigger device for the two cylinders/functions is needed. Now the upper machine table is lifted according to the description above into the position shown in FIGS. 1 and 2, in which the main carriage is coupled to the press casting machine, one of the tool carriages being moved into the machine below the raised parent tool, which then is lowered onto the carriage by lowering the upper machine table, cylinders 39 of which thereafter being activated to release lock bars 20 from pins 16. The torsional cylinders are then activated to release the entire parent tool from the upper machine table. The synchronization described above results in that cylinders 39 of the lower machine table are reactivated to bring back bars 20 to their locking position, which however is unimportant, since the bars at the moment do not mesh with any locking pins 16.

The machine table is now raised without any tools to an upper position and in this way the carriage and the entire parent tool on top of the carriage can be brought back to the main carriage, which now can be removed to a service place 65, in which there is e.g. an overhead crane or the like as a handling device 54, by means of which the upper tool half can be lifted off from the lower tool half and be turned upside-down (see FIG. 3), e.g. the inserts being accessible to make an exchange according to FIG. 4a–c, in which the sides of the two halves, which are turned towards each other, as shown in FIG. 4b, are turned upwards as shown in FIGS. 4a and 4c, and the upper half has been placed on the other tool carriage. Subsequent to the insert exchange in the two halves the upper half is brought back to the lower half, the upper half being turned around to its congruent functional position and preferably a preheating of the inserts and the central part of the tool is now done, suitably through a hot air feeding, an induction or the like, the coolant passages possibly being used for an inner heating of the tool. Also, it possibly is suitable to blow hot air between the two halves, which suitably are kept at a certain distance from each other in order to be able to blow faster a large amount of hot air into the tool and along its contact surfaces. This distance can be provided by means of the handling device and/or by means of temporary active external or internal spacing elements.

Of course, said exchanges do not have to be limited to an insert exchange, but arbitrary parts, e.g. cores, can be exchanged, inspection can be done, cleaning, repair jobs etc., at the same time or alternatively. Also, another complete parent tool can be ready and be inserted into the machine in immediate connection with the removal of a parent tool mounted in the machine. Due to all these measures and possibilities the smallest possible loss of production time and minimum manual and above all uncomfortable efforts are allowed.

When another parent tool or a parent tool having exchanged parts is to be installed in the machine again, the main carriage having a machine rail pair, which matches the used tool carriage rail pair, is positioned and now in accordance with the description above simultaneously a locking of the main carriage and a release of the tool carriage is done, the latter now being run into the machine below the raised upper machine table, which subsequently is lowered to a contact with the upper side of the parent tool. The upper tool half is now locked against the upper machine table and the torsional cylinders are activated in order to mesh with cut 44 of the lower tool half, subsequent to which the upper machine table is lifted again together with the parent tool and the tool carriage can be removed from the machine. The upper machine table is now lowered to its lowest position, which is the same as the casting position, the torsional cylinders are activated in order to release gripping elements 43 and simultaneously the lower cylinders 39 project their bars 20 to a locking position. As soon as the two tool halves contact the respective machine table, the coolant connections are connected to each other again and the coolant feeding can be started again.

Thanks to the described and shown design the core pulling devices do not put any obstacles in one's way to achieve an automatic disconnection and reconnection and what is required is only a raising of heads 47 out of cuts 49 and a lowering thereof into said cuts again. All this is done automaticly, since the heads are mechanically operated in order to move them into their inserted position, when the parent tool is lowered onto the lower machine table. The mechanical operation can be done by means of locking shoulders 79, which are fastened to the upper tool half. The latter is also provided with two swinging axel pins 80, which project outwards on opposite sides in order to be able to in a simple way grip this half by means of a lifting device and to turn it around (see FIGS. 1 and 3).

It is shown in FIGS. 1 and 2, that a tool carriage passes, when it is moved between the main carriage and the machine, one of the core pulling devices. This is feasible, since the tool carriage is sufficiently high and is provided with a central through hollow space in the longitudinal direction, by means of which the tool carriage straddles said core pulling device, which in this way does not have to be moved to another position.

I claim:

1. A vertical press casting machine having a stationary lower machine table (5), vertical support bearings (6) extending upwards from the lower machine table (5), an upper machine table (7) vertically displaceably supported on said support bearing (6), an upper and a lower tool half (9 and 10) releasably connected to the upper and lower machine tables (5 and 7) respectively, said upper and lower tool halves (9 and 10) each having mould inserts mounted therein such that said upper and said lower tool halves together form a parent tool having a horizontal mould parting, wherein said vertical press casting machine comprises:

connecting means for selectively disconnecting and connecting the tool halves to each other and to the upper and lower machine tables, and conveyance means for conveying the parent tool out of and into the casting machine;

said conveyance means comprises a rail pair (58) mounted on the lower machine table (5) running in a rearward direction, a main carriage (61) located adjacent to the lower machine table, said main carriage being movable along a displacement direction perpendicular to the rearward direction, at least one rail pair (66, 67), running in the rearward direction, mounted on the main carriage for selective alignment and connection with the rail pair (58) on the lower machine table (5), via displacement of said main carriage in the displacement direction, at least one tool carriage (60) slidably stored on said at least one rail pair (66, 67) on the main carriage (6);

wherein, when the parent tool is raised above the lower machine table by the upper machine table, at least one tool carriage (66, 67) is displaceable from the at least one rail pair on the main carriage to the rail pair on the lower support table to a position beneath the raised parent tool for receiving and removing the parent tool from the casting machine to the main carriage;

the main carriage is movable along the displacement direction from a position adjacent the casting machine to a service position, a handling device (54) is located at the service position, the handling device (54) has a lifting and turning means for lifting and turning the parent tool, the upper tool half and the lower tool half.

2. A device according to claim 1, further comprising supporting and spacing elements (14) fastened on a lower surface of the parent tool, locking pins (16) projecting downwards from the supporting and spacing elements, locking cuts (17) on diametrically opposite sides of said locking pins, the locking cuts having lower limiting surfaces (18) that slant down and out relative to the locking pins;

vertical bores (15) in the lower machine table (5) for receiving the locking pins (16) therein, longitudinally displaceable locking bars (20) in the lower machine table (5) wherein inner ends (19) of the locking bars (20) engaged the limiting surfaces (18) on the locking pins (16) clamping the locking pins in the lower machine table with a wedge action.

3. A device according to claim 2 comprising horizontal control bores (21) in the lower machine table (5) that intersect the vertical bores, each locking bar being displaceably mounted in a corresponding control bore (21), an end piece (19) attached to the end of each controlling rod, the end piece having an end opposite the control rod for engaging the locking pins (16).

4. A device according to claim 3 comprising a flange (25) on the end of the locking bar (20), a symmetrical coupling end on the end of said end piece (19) adjacent the locking bar (20), a transverse coupling cut in the coupling end of the end piece (19) for receiving and coupling with the flanged end (25) of the locking bar;

a guide slot (27) in an upper surface of said end piece (19), and a downwardly projecting guide pin (28) mounted in the machine table and engaging the guide slot (27) preventing rotation of the end piece (19) in the control bore.

5. A device according to claim 2 wherein the ends (19) of the locking bars that engage the locking pins (16) are bifurcated and have slanting lower surfaces (37) that correspond to the slanting limiting surfaces (18) on the locking pins (16), and there is a space between upper surfaces of the bifurcated ends and upper limiting surfaces of the locking cuts (17) on the locking pins (16).

6. A device according to claim 2 comprising a hydraulic cylinder (39) attached to an outer end of each locking bar (20), wherein two pairs of locking bars (20) in the lower machine table (5) are mounted in opposite sides of the lower machine table (5);

wherein there are upwardly projecting locking pins on an upper surface of the upper tool half, vertical bores in a lower surface of the upper machine table, and two pairs of horizontal locking bars in the upper machine table that clamp the locking pins in the vertical bores in the upper machine table in the same manner as in the lower machine table.

7. A device according to claim 1 comprising two torsional cylinders (41) mounted on the upper machine table (7) diagonally opposite each other, a torsional plunger (42) extending downwardly from each torsional cylinder, a horizontally extending coupling element (49) mounted to a lower end of each plunger (42), and two open gripping cuts (44) on diagonally opposite sides of said lower tool half, whereby the coupling elements (49) engage the gripping cuts (44) securing the lower tool half to the upper machine table (7) with the upper tool half therebetween, securing the parent tool as a whole to upper machine table.

8. A device according to claim 1, comprising core pulling devices (45), each core pulling device (45) comprising a horizontal operating rod projecting from the lower tool half pulling device, a operating head (47) on an end of the coupling rods extending from the lower tool half, the coupling head (47) being formed by a flange (48) on all sides of the operating rod (46);

a core pulling cylinder (51) mounted on the lower machine table, transverse coupling cuts (49) forming generally U-shaped openings in an upper side of an inner end (50) of the core pulling cylinder for receiving the coupling head (47) of the operating rod (46) when the parent tool is lowered onto the lower machine table (5) and releasing the coupling head (47) when the parent tool is raised from the lower machine table.

9. A device according to claim 8, comprising locking shoulders (79) fastened to the sides of the upper tool half, axial pins (80) projecting outwardly from the locking shoulders (79) on opposite sides of the upper tool half, said axial pins providing gripping elements for attachment to the handling device (54).

10. A device according to claim 8 wherein said tool carriage comprises a central through hollow base (81) underneath the tool carriage providing the tool carriage with a clearance high enough to clear the core pulling device when the tool carriage is moved between the main carriage and the lower machine table.

11. A device according to claim 1, comprising a position fixing device (68) comprised of a cylinder (69) mounted on a side of the lower machine table (5) adjacent the main carriage and below a plane that lies along the upper surface of the lower machine table, a piston in the cylinder (69), a piston rod extending upwardly from the piston and out the cylinder, an upwardly extending locking fork (71) on an upper end of the piston rod extending upwardly from below the machine table for selectively engaging the at least one pair of rails on the main carriage for locking the at least one pair of rails on the main carriage in alignment with the rail pair on the lower machine table (5);

a permanent stop (72) with said at least one pair of rails on the main carriage at an end of the rails opposite the lower machine table, a temporary stop (73) on the side of the main carriage adjacent the lower machine table, said temporary stop (73) being a spring loaded rocker arm that is spring biased to a first position in which one end of the rocker arm projects upwards from the main carriage to a height high enough to engage the at least one tool carriage to prevent the tool carriage from rolling off the main carriage, and is biased by the locking fork, against the spring force, to a neutral position in which the one end of the rocker arm is lowered disengaging the tool carriage and enabling the tool carriage to roll from the main carriage onto the lower machine table.

12. A device according to claim 1 wherein each tool carriage further comprises a driving device (74), large driving wheels (76), chain gearing (75) drivably connecting the drive device (74) to the drive wheels (76) drive shafts (76), extending axially from the drive wheels (76), and small carriage wheels (78) attached to the drive shaft (77).

13. A method for using a device for the tool exchange in a vertical press casting machine having a stationary lower machine table (5), vertical support bearings (6) extending upwards from the lower machine table (5), an upper machine table (7) vertically displaceably supported on said support bearing (6), an upper and a lower tool half (9 and 10) releasably connected to the upper and lower machine tables (5 and 7) respectively, said upper and lower tool halves (9 and 10) each having mould inserts mounted therein such that said upper and said lower tool halves together form a parent tool, comprising the steps of:

releasing the lower tool half from the lower machine table and securing the lower tool half to the upper machine table with the upper tool half between the lower tool half and the upper machine such that the entire parent tool is now secured to the upper machine table;

moving the upper machine, with the parent tool attached thereto, to a raised position, aligning a main carriage with the lower machine table and rolling a tool carriage from the main carriage to the lower machine table to a position beneath the raised parent tool;

lowering the upper machine table until the parent tool rests on the tool carriage;

releasing the parent tool from the upper machine table and raising the upper machine table leaving the parent tool resting on the tool carriage;

rolling the tool carriage from the lower machine table to the main carriage and rolling the main carriage to a service area;

lifting the upper tool half from the lower tool half and turning the upper tool half over with a handling device (54) making the mold inserts in the upper tool half accessible for one of cleaning, repair and exchange;

turning the upper tool half back over and lowering the upper tool half back onto the lower tool half with the handling device;

aligning the main carriage with the lower machine table and rolling the tool carriage, with the parent tool resting thereon, onto the lower machine table to a position beneath the upper machine table;

lowering the upper machine table until it engages the parent tool and securing the upper and lower tool halves thereby securing the entire parent tool to the upper machine table;

raising the upper machine table, with the parent tool attached thereto, and rolling the tool carriage from the machine table to the main carriage;

lowering the upper machine table until the parent tool rests on the lower machine table; and securing the lower tool half to the lower machine table and releasing the lower tool half from the upper machine table.

* * * * *